(12) United States Patent
Loup

(10) Patent No.: US 9,982,135 B2
(45) Date of Patent: May 29, 2018

(54) POLYMER-BITUMEN PRIMARY MIXTURES THAT CAN BE USED FOR PREPARING POLYMER-BITUMEN BINDERS, AND PRODUCTS OBTAINED FROM THESE PRIMARY MIXTURES

(71) Applicant: EIFFAGE INFRASTRUCTURES, Velizy Villacoublay (FR)

(72) Inventor: Frédéric Loup, Villeurbanne (FR)

(73) Assignee: EIFFAGE INFRASTRUCTURES, Velizy Villacoublay (FR)

( * ) Notice: Subject to any disclaimer, the term of this patent is extended or adjusted under 35 U.S.C. 154(b) by 0 days. days.

(21) Appl. No.: 15/112,581

(22) PCT Filed: Jan. 21, 2015

(86) PCT No.: PCT/FR2015/050142
§ 371 (c)(1),
(2) Date: Jul. 19, 2016

(87) PCT Pub. No.: WO2015/110754
PCT Pub. Date: Jul. 30, 2015

(65) Prior Publication Data
US 2016/0347953 A1    Dec. 1, 2016

(30) Foreign Application Priority Data
Jan. 21, 2014 (FR) ..................................... 14 50448

(51) Int. Cl.
| | | |
|---|---|---|
| C08L 95/00 | (2006.01) | |
| C08L 9/06 | (2006.01) | |
| C08L 65/00 | (2006.01) | |
| C08L 91/00 | (2006.01) | |
| C04B 26/26 | (2006.01) | |
| C08L 93/00 | (2006.01) | |
| C04B 40/00 | (2006.01) | |
| C09D 195/00 | (2006.01) | |
| C09J 195/00 | (2006.01) | |
| E01C 7/26 | (2006.01) | |
| C04B 111/00 | (2006.01) | |
| C04B 111/20 | (2006.01) | |
| C04B 111/27 | (2006.01) | |

(52) U.S. Cl.
CPC ............ C08L 95/00 (2013.01); C04B 26/26 (2013.01); C04B 40/0039 (2013.01); C08L 9/06 (2013.01); C08L 65/00 (2013.01); C08L 91/00 (2013.01); C08L 93/00 (2013.01); C08L 95/005 (2013.01); C04B 2111/0075 (2013.01); C04B 2111/2046 (2013.01); C04B 2111/27 (2013.01); C09D 195/00 (2013.01); C09D 195/005 (2013.01); C09J 195/00 (2013.01); C09J 195/005 (2013.01); E01C 7/265 (2013.01)

(58) Field of Classification Search
CPC ............................... C08L 95/00; C08L 95/005
See application file for complete search history.

(56) References Cited

U.S. PATENT DOCUMENTS

| | | | |
|---|---|---|---|
| 5,965,626 A | 10/1999 | Tzeng et al. | |
| 5,965,926 A | 10/1999 | Tzeng et al. | |
| 6,156,113 A * | 12/2000 | Pasquier | ................ C08K 5/101 106/269 |
| 6,346,561 B1 * | 2/2002 | Osborn | ................ B01F 3/1228 521/40.5 |
| 8,748,517 B2 | 6/2014 | Harders et al. | |
| 2006/0089431 A1 | 4/2006 | Kawakami et al. | |
| 2010/0193127 A1* | 8/2010 | Fouquay | ................... B32B 7/12 156/703 |
| 2012/0184650 A1* | 7/2012 | Barnat | ................. C08L 95/005 524/60 |
| 2012/0298734 A1* | 11/2012 | Bradshaw | ................. C09J 7/04 229/212 |

FOREIGN PATENT DOCUMENTS

| | | |
|---|---|---|
| JP | 2009-40827 | 2/2009 |
| KR | 101 123 783 | 3/2012 |
| WO | 94/10256 | 5/1994 |
| WO | 2005/087869 | 9/2005 |

(Continued)

OTHER PUBLICATIONS

English Machine Translation of WO2007068461, Jul. 20, 2017.*
International Search Report dated May 6, 2015 in International (PCT) Application No. PCT/FR2015/050142.
Written Opinion of the International Searching Authority dated May 6, 2015 in International (PCT) Application No. PCT/FR2015/050142, with English translation.
Fujita et al., "Miscibility between Natural Rubber and Tackifiers. I. Phase Diagrams of the Blends of Natural Rubber with Rosin and Terpene Resins", Journal of Applied Polymer Science, vol. 64, No. 11, Jun. 13, 1997, pp. 2191-2197, XP055153364.
Anonymous, "Piccotac™ 1095-N Hydrocarbon Resin", Eastman Product data, Nov. 2005, pp. 1-2, XP055053416.
Anonymous: "Eastoflex™ amorphous polyolefins", Eastman, Aug. 2013, pp. 1-8, XP055153528.

(Continued)

Primary Examiner — Christopher M Rodd
(74) Attorney, Agent, or Firm — Wenderoth, Lind & Ponack, L.L.P.

(57) ABSTRACT

The aim of the invention is to provide, at a lower cost, novel primary mixtures that can be used for preparing polymer bitumens. For this purpose, the primary mixture according to the invention comprises: (a) at least 25% by weight, preferably 25 to 80% by weight, of polymer, (b) at least one thermoplastic tackifying resin having an average molecular mass of 100 to 3,000 g/mol, (c) and/or one or more mono-alkyl—preferably methyl—esters of fatty acids at C16-C18, in particular sunflower oil, linseed oil, rapeseed oil, soybean oil, and/or sunflower oil that is optionally isomerized; the ester (c) necessarily being present when the tackifying resin (b) has an acid value measured according to standard NF EN ISO 660 of less than 50 mg KOH/g. The invention also concerns the polymer bitumens, emulsions and coatings/coated products obtained from this primary mixture, as well as the methods for preparing same.

15 Claims, No Drawings

(56) References Cited

FOREIGN PATENT DOCUMENTS

| WO | WO 2005087869 A1 * | 9/2005 | ............. C08L 95/00 |
|----|--------------------|--------|--------------------------|
| WO | WO 2007068461 A1 * | 6/2007 | ............. C04B 26/26 |
| WO | 2007/095707 | 8/2007 | |
| WO | 2008/039901 | 4/2008 | |

OTHER PUBLICATIONS

Marin et al., "Rheology and Adherence of Pressure-Sensitive Adhesives", The Journal of Adhesion, vol. 82, No. 5, Jun. 2006, pp. 469-485, XP055153417.

* cited by examiner

POLYMER-BITUMEN PRIMARY MIXTURES THAT CAN BE USED FOR PREPARING POLYMER-BITUMEN BINDERS, AND PRODUCTS OBTAINED FROM THESE PRIMARY MIXTURES

FIELD OF THE INVENTION

The invention relates to the field of bituminous binders or emulsions of bituminous binders, in particular bitumens modified by at least one polymer, hereinafter also referred to as polymer-bitumen binders or modified bitumens. These binders can be used for producing road surfaces or in industrial applications (insulation-damping-sealing).

In particular, the invention relates to a primary mixture intended to be mixed with bitumen in order to prepare a binder modified with polymer; and then optionally secondly a polymer-bitumen emulsion.

The invention also relates to the manufacture of such products.

TECHNOLOGICAL BACKGROUND OF THE INVENTION

Bituminous binders may be either anhydrous bituminous binders or bituminous emulsions. The latter are prepared by dispersing anhydrous bituminous binders in an aqueous phase, in the presence of emulsifiers.

Polymer-bitumen binders may be cross-linked, conventionally by means of sulphur or derivatives thereof.

"Road" bituminous binders fulfil their binding function in:
- "hot coated materials" obtained by the hot mixing of anhydrous bituminous binders with aggregates, these mixtures then being spread on the roadway in order to form road surfaces;
- "surface coatings with anhydrous binders" obtained by hot spreading on the roadway first of all of an emulsion of bituminous binders and mixed aggregates;
- "cold coated materials" obtained by the cold mixing of bituminous emulsions with aggregates, these mixtures then being spread on the roadway in order to form road surfaces;
- or "surface coated materials with bituminous emulsions" obtained by the cold spreading on the roadway first of all of bituminous emulsions and mixed aggregates.

These coated materials or coatings must first of all form a homogenous mixture comprising a bituminous matrix and aggregates dispersed in this matrix. The rheology of this mixture must be suited to the application on roadways to form a road surface.

Once applied, these coated materials or coatings must next increase in cohesion in order to be transformed into a road surface provided with the expected durable mechanical properties.

Heating; putting in emulsion and/or fluxing (or fluidification) by means of bitumen solvents (fluxes are means normally used for obtaining the consistency suitable for the application.

The heating and use of fluxes of petroleum origin containing volatile organic compounds (VOCs) have negative environmental repercussions.

An improvement has been made to fluidification by fluxing through EP 900822 B1, which proposes fluxes for bituminous binders consisting of one or more methyl monoesters of C16-C18 fatty acids, in particular sunflower oil, linseed oil and/or isomerised sunflower oil.

The purpose of modifying bitumens by means of polymers is in particular to improve thermal resistance, cohesion, elongation capacity, viscoelastic characteristics and passive adhesive strength (better resistance to decoating on the roadway) of the hardened bituminous surfaces. These polymer-bitumens are used both for anhydrous coating materials/coatings and for coated materials/coatings comprising emulsions.

The modification of bitumens by polymers is therefore now unavoidable, but is not without problems in terms of manufacture. This is because polymer-bitumen binders are obtained by the gradual addition of a polymer to a bitumen, hot, in a mechanical grinder/dispersing machine. This operation, the purpose of which is to disperse the polymer in the bitumen, is difficult to perform. It requires the use of a specific grinder/dispersing machine, of high performance and very expensive. It also requires long periods of dispersion/grinding, for example 1 to 3 hours.

To facilitate this operation and to obtain better dispersion, use of a counting oil such as an oil of petroleum, plant or mineral origin, for example at the rate of 3% to 7% by weight with respect to the bitumen, is known.

This manufacture of polymer-bitumen therefore requires an infrastructure that is not only a problem on an economic level but also has an environmental impact.

Since it is not possible to increase the number of such infrastructures and having regard to the cost of transporting these polymer-bitumen compositions, primary polymer-bitumen mixtures with a concentration of polymer have been developed.

FR 2951188 B1 thus discloses a polymer-bitumen mother solution free from oil of undesirable petroleum origin but rather comprising at least one oil of plant and/or animal origin, at least 20% by weight of polymer, with respect to the weight of the mother solution, with or without at least one cross-linking agent. This oil of plant and/or animal origin is acidic and its acid value measured in accordance with NF EN ISO 660 is between 50 and 300 mg KOH/g, for example between 140 and 196 mg. It is chosen from fatty acids of tall oil or rapeseed oil, taken alone or in a mixture.

According to FR 2951188 B1, the mother solution in question has a very high polymer concentration. In contradiction, it is however indicated in FR 2951188 B1 that "the mother solution according to the invention preferably comprises at least 50% by weight of polymer", and in the following paragraph this concentration of polymer is "preferably from 20% to 50% by mass of polymer, with respect to the mass of the mother solution, preferably from 25% to 45%, more preferentially from 30% to 40%, even more preferentially from 32% to 35%, and this without any phenomenon of gelling during preparation and/or storage thereof". With respectively 25% and 40% by mass of polymer, the examples in FR 2951188 B1, $SM_5$ $SM_{5bis}$ on the one hand and $SM_6$ $SM_{6bis}$ on the other hand are therefore situated in the second "preference".

It therefore appears that the objective of FR 2951188 B1, which is to obtain a polymer-bitumen mother solution with a very high concentration of polymer, is not actually achieved.

WO 02/10285 describes dry liquid concentrates intended to be mixed with bitumens and containing granulates of rubber (55%-95%) and tall oil (45%-5%).

The polymer/plant oil mixtures of the prior art can be improved, in particular in terms of use and impact on the physical and chemical properties of the polymer-bitumens in which they are incorporated.

OBJECTIVES OF THE INVENTION

The invention aims to improve the polymer/plant oil mixtures of the prior art and in particular to satisfy at least one of the following objectives:
- providing at less cost novel primary mixtures useful for preparing polymer-bitumens;
- providing at less cost novel primary mixtures useful for preparing polymer-bitumens with a high concentration of polymer;
- providing at less cost novel primary mixtures useful for preparing polymer-bitumens that are stable in storage (no reagglomeration);
- providing at less cost novel primary mixtures useful for preparing polymer-bitumens, able to be easily incorporated in the bitumen, that is to say, for example, quickly and without expensive and sophisticated mixing devices;
- providing at less cost novel primary mixtures useful for preparing polymer-bitumens, making it possible to obtain bitumen/polymer compositions provided with good consistency characteristics in the viscous state (penetrability, ball and ring temperature and low susceptibility), and good mechanical properties in the solid/hardened state (elastic return, cohesion and tensile strength);
- providing, easily and at less cost, novel polymer-bitumens obtained from primary mixtures as defined in the above objectives;
- providing, easily and at less cost, novel emulsions prepared from the polymer-bitumens as defined in the above objective;
- providing, easily and at less cost, novel coated mixtures or road coatings, obtained from bituminous binders or emulsions as defined in the above objectives;
- providing simple and economical methods for preparing novel products as defined in the above objectives.

DESCRIPTION OF THE INVENTION

To this end, according to a first aspect, the invention proposes a primary mixture useful for preparing bitumen/polymer compositions, said primary mixture comprising:

(a) at least 25% by weight, preferably 25% to 80% by weight, of polymer, (b) at least one thermoplastic tackifying resin with a mean molecular mass of between 100 and 3000 g/mol, (c) and/or one or more alkyl—preferably methyl—(mono)esters of C16-C18 fatty acids, in particular sunflower oil, linseed oil, rapeseed oil, soya oil, and/or sunflower oil isomerised or not;

ester (c) necessarily being present when the tackifying resin (b) has an acid value measured in accordance with NF EN ISO 660 of less than 50 mg KOH/g.

These primary mixtures have a high polymer concentration, and are stable in storage, easily manipulatable and preparable, and comply with the specifications required for the polymer-bitumens that they make it possible to obtain easily by mixing with bitumen. These primary mixtures are therefore a primary material advantageous for the manufacture of polymer-bitumens, in particular in that it affords a reduction in transport and logistic costs, since these primary mixtures can be stored and transported without degradation at ambient temperature, and therefore easily diluted in bitumen, subsequently, on the polymer-bitumen composition production site.

Optionally, the ester (c) may be required to be present in the primary mixture, in the case where the mixture (a)-(h) comprises from 55% to 95% by weight of polymer (a) and 45% to 5% by weight of tall oil, by way of resin (b).

The primary mixture may be a bulk mass/paste unshaped, or, according to an advantageous feature of the invention, be put in the form of discrete elements such as granules, blocks or bricks, this shaping preferably being carried out after extrusion.

In these discrete forms, the product is easy to manipulate, store and transport.

They also assist dispersion of the primary mixture in bitumen for preparing polymer-bitumens.

In a first embodiment, the primary mixture according to the invention comprises components (a) and (h) in the following proportions as a percentage by weight:
(a) from 25 to 55; preferably from 30 to 50;
(b) from 75 to 45; preferably from 70 to 50.

In a second embodiment, the primary mixture according to the invention comprises components (a) and (c) in the following proportions as a percentage by weight:
(a) from 25 to 80; preferably from 30 to 70;
(c) from 75 to 20; preferably from 70 to 30.

In a third embodiment, the primary mixture according to the invention comprises components (a), (b) and (c) in the following proportions as a percentage by weight:
(a) from 25 to 80; preferably from 30 to 70;
(h) from 15 to 70; preferably from 25 to 55;
(c) from 5 to 20; preferably from 5 to 15.

Polymer (a)

The polymer (a) of the primary mixture is a normal polymer-bitumen polymer, namely the following co- or homopolymers, e.g.: biopolymers of plant, animal and protein origin, polybutadienes, polyisoprenes, butyl rubbers, polyacrylates, polymethacrylates, polychloroprenes, polynorbornenes, polybutenes, polyisobutenes, polyethylenes, copolymers of ethylene and vinylacetate, copolymers of ethylene and methyl acrylate, copolymers of ethylene and butyl acrylate, copolymers of ethylene and maleic anhydride, copolymers of ethylene and glycidyl methacrylate, copolymers of ethylene and glycidyl acrylate, copolymers of ethylene and propene, ethylene/propene/diene terpolymers (EPDM), acrylonitrile/butadiene/styrene (ABS) terpolymers, ethylene/acrylate or alkyl methacrylate/glycidyl acrylate or methacrylate terpolymers and in particular ethylene/methylacrylate/glycidyl methacrylate terpolymers and ethylene/alkyl acrylate or methacrylate/maleic anhydride terpolymers and in particular ethylene/butylacrylate/maleic anhydride terpolymers.

The polymer (a) adopted is preferably a styrene and butadiene copolymer with a linear or star molecular structure, having a proportion of styrene units of between 5% and 50% by mass with respect to the total mass of butadiene units, preferably between 10% and 40%, more preferentially between 15% and 30%, even more preferentially between 20% and 30%. Its mean molecular mass Mw may advantageously be between 50,000 and 800,000 Daltons, preferably between 60,000 and 700,000, more preferentially between 80,000 and 500,000, even more preferentially between 100,000 and 400,000, even more preferentially between 110,000 and 300,000. The molecular mass of the copolymer is measured by GPC chromatography with a polystyrene standard in accordance with ASTM D3536.

The primary mixture may, in a manner known per se, contain a polymer (a) cross-linking agent. Conventionally, this cross-linking agent is chosen according to the type or types of polymer contained in the primary mixture according to the invention, for example:

sulphur (flowers of sulphur or alpha crystallised sulphur);
hydrocarbyl polysulphurs, taken alone or in a mixture, optionally in the presence of vulcanisation accelerators, sulphur donors or not, taken alone or in a mixture;
compounds of general formula HS—R—SH, where R represents a hydrocarbon group, saturated or unsaturated, linear or branched, from 2 to 40 carbon atoms, optionally comprising one or more heteroatoms, such as oxygen.

Tackifying Resins (b)

To complete this primary mixture, the inventors had the merit of isolating:

a first population of particularly suitable tackifying resins (b), namely those having an acid value AV measured in accordance with NF EN ISO 660 of less than 50 mg KOH/g, preferably less than—in increasing order of preference—: 40; 30; 20; 10; 5; 4; 3; 2;
a second population of particularly suitable tackifying resins (b), namely hydrocarbon resins;
a third population of particularly suitable tackifying resins (b), namely phenolic terpene resins;
a fourth population of particularly suitable tackifying resins (b), namely those having a viscosity in the molten state measured at 160° C. of between 100 and 5000 mPa·s, preferably between 300 and 3000 mPa·s;
said resin (b) being able to belong to at least one of the aforementioned four populations.

The tackifying resins (b) that are favoured in accordance with the invention are in particular:

terpene-phenol resins (Dertophene® T) with an acid value of between 0.5 and 1.5; with an Mw of between 500 and 1000 Daltons, and the aromatic solubility of which given by the "mixed methylcyclohexane-aniline point (MMAP)" is between 10 and 50,
C5 aliphatic resins (Piccotac® 1095N) with an AV of between 0.5 and 1.5; an Mw of between 1000 and 2500 Daltons, and the aromatic solubility of which given by the "mixed methylcyclohexane-aniline point (MMAP)" is between 80 and 150,
C5 aliphatic resins modified by aromatic units (Piccotac® 7590N) with an acid value of between 0.5 and 1.5 and an Mw of between 1000 and 2500 Daltons, and the aromatic solubility of which given by the "mixed methylcyclohexane-aniline point (MMAP)" is between 50 and 150,
aliphatic resins (Escorez® 1310 LC) with an acid value of between $10^{-3}$ and 0.1; with a wax cloud point (WCP) of between 60° C. and 90° C. (79° C.) and an Mw of between 500 and 2500 Daltons,
aliphatic resins (Escorez® 1102) with a wax cloud point (WCP) of between 100° C. and 200° C., and an Mw of between 500 and 2500 Daltons,
and mixtures thereof Component (c)

Component (c) is in fact and preferably an oil or a mixture of oils containing fatty acids at least partly (trans)esterified, with at least one alcohol, e.g. an alkanol, such as methanol, ethanol, propanol or butanol. All or some of the fatty acids of ester (c) are advantageously C16-C18. The oil or oils of component (c) is/are preferably of plant origin (sunflower, soya, linseed, etc.). One example of ester (c) is the product of the transesterification of sunflower, soya and/or linseed oil(s), by methanol.

Dispersibility D of the Primary Mixture

Given its purpose, the primary mixture according to the invention can be defined through its dispersability D in bitumen, measured by a method Md and expressed by a time in minutes beyond which there is no longer any residue of supernatant primary mixture detectable visually, on the surface of the bitumen, on the walls of the container, after stoppage of the agitation (vortex):

D≤60 preferably D≤40.

The method Md is defined in the following examples.

Expressed otherwise, the primary mixture according to the invention advantageously has a dispersability D in bitumen that is sufficiently high to be able to be introduced directly into a device under agitation and thermoregulated, without recourse to the use of a disperser/hinder and without causing disturbances.

Here "disturbance" means for example particles of polymer rising to the surface, the presence of residues of primary mixture that are poorly dispersed, or a heterogeneity of the final mixture, which is synonymous with a reduction in the thermomechanical performances of the polymer-modified bitumen.

Method for Obtaining the Primary Mixture

In another of its aspects, the invention relates to a method for obtaining a primary mixture useful for preparing bitumen/polymer compositions, this primary mixture being in particular the one defined above. This method is characterised in that it consists essentially of extruding/mixing:

(a) at least one polymer,
(b) at least one tackifying resin,
(c) and/or one or more oils, at least partially transesterified or not.

(a); (b); (c) are preferably the components defined above.

In accordance with the invention, extrusion is a preferred method for mixing or homogenising, among others.

The preferred method for obtaining a primary mixture by extrusion may in particular be implemented on a dual-screw extruder, as described in more detail in the following examples.

Polymer-Bitumen Issuing Front the Primary Mixture According to the Invention and Method for Preparing this Polymer-Bitumen In yet another of its aspects, the invention relates to a polymer-bitumen prepared from a primary mixture as defined above.

In yet another of its aspects, the invention relates to a method for preparing polymer-bitumen as defined above, this method being characterised in that it consists essentially of mixing at least one bitumen with at least one primary mixture as defined above.

Among the mixers that can be used, there are simple mixers such as those used in factories manufacturing polymer-modified bitumens or the like, or extruders.

The bitumen may be selected from bitumens of natural origin, such as those contained in deposits of natural bitumen, natural asphalt or bituminous sands. The bitumen that can be used according to the invention may also be a bitumen or a mixture of bitumens coming from the refining of crude oil such as direct-distillation bitumens or bitumens distilled under reduced pressure or blown or semi-blown bitumens, residues of propane or pentane deasphalting or visco-reduction residues, these various cuts being able to be taken alone or in a mixture. The bitumens used may also be bitumens fluxed by the addition of volatile solvents, fluxes of petroleum origin, carbochemical fluxes and/or fluxes of plant origin. It is also possible to use synthetic bitumens, also referred to as clear, pigmentable or colourable bitumens. The bitumen may be a bitumen of naphthene or paraffin origin, or a mixture of these two bitumens. For example, the bitumen is a 160/220 bitumen.

Emulsions

In yet another of its aspects, the invention relates to an emulsion prepared from the polymer-bitumen defined above.

In practice, the method and device for preparing the emulsion are conventional. The methodology and the general conditions preferred are described in the following examples.

Surfacings

In yet another of its aspects, the invention relates to a road surfacing (e.g. a coated material or coating), obtained from polymer-bitumen or from the emulsion as defined above.

The invention will be understood better in the light of the following examples.

EXAMPLES

-I- Method Md for Measuring e Dispersibility D of the Primary Mixture in Bitumen 6.7 grams of primary mixture are introduced into 93.3 grams of 160/220 bitumen maintained at between 160° and 170° C. under simple mechanical stirring by an impellor agitator.

The receptacle is a metal container with a capacity of 2 liters.

The 160/220 bitumen comes from the Esso refinery at Port Jerome-Gravenchon (Seine-Maritime).

The temperature-maintenance means consist of an IKA-MAG HP10 hotplate associated with an IKA ETS D5 temperature sensor The impellor agitator is of the IKA RW20 type.

The simple stirring is carried out at a speed of 700 rev/min.

A measurement is made of the duration D in minutes beyond which there is no longer any residue of supernatant primary mixture detectable visually on the surface of the bitumen, or on the walls of the container. The time t0 for measuring D corresponds to the end of the introduction of the primary mixture in the bitumen.

-II- Devices and Methods

1. To manufacture the "primary mixtures", that is to say without bitumen,

We used a 50 D dual-screw extruder

Throughput=4 kg/h

Rotation speed=200 to 500 rev/min

Temperature profiles:

i. Zone 1 (introduction of resins and/or methyl ester vegetable oil)=40° C. to 160° C.;

ii. Zone 2 (introduction of polymer)=120° to 160° C.;

iii. Zones 3 and 4 (mixing/mingling of constituents)=120° C. to 160° C.,

2. To manufacture the "polymer-bitumens" [tests 1 to 4 (Table 1)), the Method Md described above is used.

3. To manufacture the "emulsions from polymer-bitumens" [Tests 5 to 9 (Table 2)):

A Moritz BF50 grinder/disperser was used;

The manufacturing temperature is between 160° and 180° C.;

The pressure adopted for making the emulsions is around 1 bar.

-III- Raw Materials:

(a) The polymer used for this study is SBS ICO (linear) in the form of powder, 30% to 33% styrene content. Elongation greater than or equal to 7%, Shore A hardness 70 to 80, breaking strength (kg/m$^2$) greater than or equal to 200, Mw between 150,000 and 250,000 g/mol.

(b) Tackifying Resins

ESCOREZ 1102 (manufactured by Exxon Mobil)

ESCOREZ 1310 (manufactured by Exxon Mobil)

DERTOPHENE T (manufactured by DRT)

PICCOTAC 1095 (manufactured by Eastman)

PICCOTAC 7590 (manufactured by Eastman).

(c) Component (c): Methyl ester of plant oils, for example Oleoflux® 18

(d) Bitumen emulsions modified by polymer (a)

Raw Materials:

For the bituminous phase, the initially manufactured polymer-bitumen binder containing 4% SBS will be used, issuing from the dissolution of the primary mixtures in 160/220 bitumen.

Concerning the aqueous phase, this is composed of:

29.32% water 0.25% emulsamine [60 (surfactant)

0.21% of 33% commercial HCl 0.2% of $CaCl_2$ 0.02% Coatex (Viscodis 174) (thickener)

qsp methyl ester of plant oils

-IV- Measurement Methods:

-IV.1- 160/220 Bitumen Added to the Primary Mixtures

1. The ball and ring softening temperature (EN 1427)

2. Measurement of the FRAASS brittleness point (EN 12593

3. Penetrability test at 25° C. (EN 1426)

4. Measurement of elastic return (EN 13398)

5. Brookfield viscosity (EN 13702)

-IV.2- Emulsions

On the emulsion (bitumen phase and aqueous phase) tests 5 to 9 (Table 2)

The water content (XPT60-080)

The pH of the emulsion and of the aqueous phase (EN 12850)

The rupture index of the cationic emulsions (EN 13075-1)

The residues on sieve (EN 1429)

The STV pseudoviscosity (EN 12846-2)

Stability under storage at 7 days

Adhesive strength on dried chippings (EN 13614)

Median diameter of emulsion Mastersizer LASER

On the binder recovered after evaporation of the aqueous phase tests 5 to 9 (Table 2)→2$^{nd}$ part of table Penetrability at 25° C. (EN 1426)

TBA ball-ring softening temperature (EN 1427)

Elastic return (EN 13398)

FRAASS temperature (EN 12593)

"Pendulum ram impact" cohesion (EN 13588)

-V- Tests and Results:

Tests 1 to 4 were carried out on the primary mixtures: Table 1 (references 1 to 4).

Tests 5 to 9 are carried out on the emulsions: Table 2 (references 5 to 9).

Tables 1 and 2 below give the test conditions and the results obtained for tests 1 to 9.

TABLE 1

| TESTS | Resins (b) Material 1 | % Material 1 | Polymer (a) Material 2 | % Material 2 | Methyl ester (c) Material 3 | % Material 3 | Dispersability D (min) of primary mixtures in 160/220 bitumen |
|---|---|---|---|---|---|---|---|
| 1 | Dertophene | 50 | SBS | 50 | — | — | 1 hour |
| 2 | — | — | SBS | 60 | Oleoflux | 40 | 15 minutes |
| 3 | Escorez 1310 | 65 | SBS | 30 | Oleoflux | 5 | 40 minutes |
| 4 | Dertophene | 35 | SBS | 50 | Oleoflux | 15 | 40 minutes |

| TESTS | Results of tests | | | | |
|---|---|---|---|---|---|
| | Penetrability at 25° C. | Ball and ring temperature | Elastic return | FRAASS temperature | Viscosity at 120° C. |
| 1 | 97 | 55 | 70 | −12 | 8.2 |
| 2 | 284 | 42 | 85 | −21 | 4.8 |
| 3 | 103 | 50 | 82 | −12 | 8.8 |
| 4 | 137 | 62 | 90 | −15 | 7.2 |
| Reference = 160/220 bitumen + 4% SBS in powder form | 111 | 58 | 85 | −13 | 8 |

TABLE 2

TABLE OF RESULTS

| | Mixture number | | | | |
|---|---|---|---|---|---|
| | 5 | 6 | 7 | 8 | 9 |
| Products: | Reference emulsion | Methyl ester (40%) + SBS (60%) | Dertophene T (50%) + SBS (50%) | Dertophene T (45%) + methyl ester (5%) + SBS (50%) | Piccotac 1095 (65%) + methyl ester (15%) + SBS (30%) |
| References: | | | | | |
| Rate of dispersion of primary mixtures in bitumen | 2 h | 15 min | 1 h | 40 min | 40 min |
| Results of tests | | | | | |
| Residue on 0.50 mm sieve % | 0.14 | 0.00 | 0.00 | 0.01 | 0.01 |
| Particles between 0.5 mm and 0.16 mm % | 11.73 | 0.37 | 0.09 | 0.54 | 0.67 |
| Median diameter Mastersizer Laser 2000 (μm) | 9.5 | 4.3 | 4.0 | 5.3 | 3.6 |
| Rupture index | 97 | 58 | 57 | 75 | 69 |
| * measured with Sikaïsol fines (0.25 to 0.45 g/s fines, 25 +/− 1° C., 1 r/s) | | | | | |
| STV pseudoviscosity 40° C. 4 mm (s) | 13 | 42 | 26 | 27 | 24 |
| Stability in storage 7 days by sieving (0.5 mm sieve) | — | 0.00 | 0.00 | 0.02 | 0.00 |
| Adhesive strength Resistance to decoating by water (%) | 90 | 90 | 100 | 90 | 90 |

The invention claimed is:

1. A primary mixture for preparing bitumen-polymer compositions, said primary mixture comprising:
   (a) a styrene and butadiene copolymer with a linear or star molecular structure, having a proportion of styrene units of between 5% and 50% by mass with respect to the total mass of butadiene units,
   and at least one selected from the group consisting of:
   (b) at least one thermoplastic tackifying resin with a mean molecular mass of between 100 and 3000 g/mol, and
   (c) at least one methyl-(mono)ester of a C16-C18 fatty acid made of the product of the transesterification of sunflower, soya and/or linseed oil(s), by methanol;
   wherein (c) is necessarily present when the tackifying resin (b) has an acid value measured in accordance with NF EN ISO 660, of less than 50 mg KOH/g;
   wherein (a) is from 30 to 50 or from 30 to 70% by weight when the mixture contains (a) and (b) or (a) and (b) and (c); and
   wherein (a) is from 60 to 70% by weight when the mixture contains (a) and (c).

2. The primary mixture according to claim 1, comprising components (a) and (b) in the following proportions as a percentage by weight:
   (a) from 30 to 50;
   (b) from 70 to 50.

3. The primary mixture according to claim 1, comprising components (a) and (c) in the following proportions as a percentage by weight:
   (a) from 60 to 70;
   (c) from 40 to 30.

4. The primary mixture according to claim 1, comprising components (a), (b) and (c) in the following proportions as a percentage by weight:
   (a) from 30 to 70;
   (b) from 25 to 55;
   (c) from 5 to 15.

5. The primary mixture according to claim 1, wherein the tackifying resin (b) has an acid value, measured in accordance with NF EN ISO 660, of less than 50 mg KOH/g.

6. The primary mixture according to claim 1, wherein the tackifying resin (b) is selected from the group consisting of hydrocarbon resins, phenolic terpene resins, and combinations thereof.

7. The primary mixture according to claim 1, wherein the mixture has a dispersibility D in bitumen, measured by a method Md and expressed by a period in minutes beyond which there is no longer any residue of supernatant primary mixture detectable visually, on the surface of the bitumen, or on the walls of the container of $D \leq 60$ minutes.

8. The primary mixture according to claim 7, wherein the mixture is capable of being directly introduced in bitumen under stirring in a thermoregulated device.

9. A method for obtaining the primary mixture according to claim 1, said method consisting essentially of mixing component (a) with at least one selected from the group consisting of components (b) and (c).

10. A method for preparing a bitumen-polymer composition, said method consisting essentially of mixing at least one bitumen with at least one primary mixture according to claim 1.

11. A bitumen-polymer composition prepared by the method according to claim 10.

12. An emulsion comprising the bitumen-polymer composition according to claim 11.

13. A road surfacing composition comprising the bitumen-polymer composition according to claim 11.

14. An emulsion comprising a bitumen and the primary mixture according to claim 1.

15. A road surfacing composition comprising the emulsion according to claim 12.

\* \* \* \* \*